(12) United States Patent
Yasuoka et al.

(10) Patent No.: US 6,311,665 B1
(45) Date of Patent: Nov. 6, 2001

(54) DIRECT INJECTION ENGINE

(75) Inventors: Takehiko Yasuoka; Hiroyuki Yamamoto; Tohru Shiraishi; Hiroyuki Yamashita, all of Fuchu-cho (JP)

(73) Assignee: Mazda Motor Corporation, Hiroshima-ken (JP)

(*) Notice: Subject to any disclaimer, the term of this patent is extended or adjusted under 35 U.S.C. 154(b) by 0 days.

(21) Appl. No.: 09/453,821

(22) Filed: Dec. 3, 1999

(30) Foreign Application Priority Data

Dec. 10, 1998 (JP) .................................................. 10-351875

(51) Int. Cl.⁷ ...................................................... F02B 23/10
(52) U.S. Cl. ........................... 123/260; 123/276; 123/301
(58) Field of Search .................................... 123/260, 262, 123/276, 295, 301, 298

(56) References Cited

U.S. PATENT DOCUMENTS

| 5,553,588 | 9/1996 | Gono et al. | 123/276 |
| 5,727,520 | 3/1998 | Wirth et al. | 123/305 |
| 5,775,288 | 7/1998 | Suzuki et al. | 123/298 |

FOREIGN PATENT DOCUMENTS

| 198 14 693 A1 | 10/1998 | (DE) . |
| 0 824 185 A2 | 2/1998 | (EP) . |
| 0 881 369 A2 | 2/1998 | (EP) . |
| 0 875 672 A2 | 11/1998 | (EP) . |
| 09317473 | 12/1997 | (JP) . |
| 10159568 | 6/1998 | (JP) . |
| 10-280964 | * 10/1998 | (JP) . |

* cited by examiner

*Primary Examiner*—Andrew M. Dolinar
(74) *Attorney, Agent, or Firm*—Nixon Peabody LLP; Donald R. Studebaker

(57) ABSTRACT

A direct injection engine in which an injector injects fuel toward a cavity formed in a top surface of a piston to produce a locally distributed mixture around a spark plug is constructed such that the direction of a fuel spray ejected from the injector is varied during a fuel injection period to properly spread the mixture and prevent its local overrichness. The direct injection engine is provided with means for generating a swirl, for example, so that the fuel spray from the injector is directed toward the spark plug when the pressure in a cylinder is low in a compression stroke, and the fuel spray is deflected by the swirl away from the direction of the spark plug as the pressure in a cylinder increases.

13 Claims, 11 Drawing Sheets

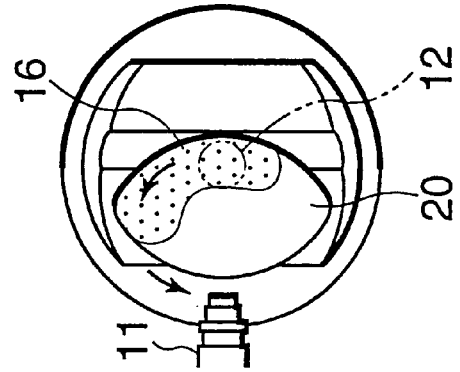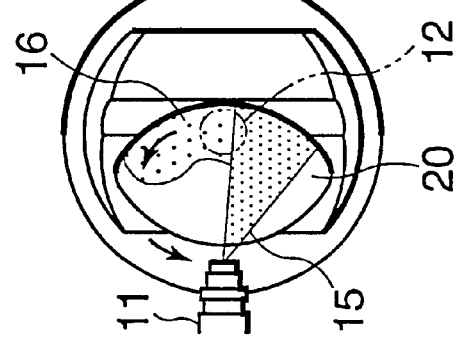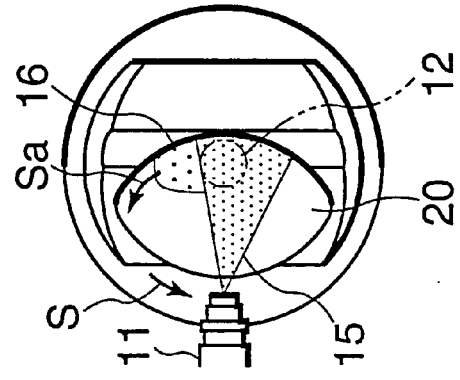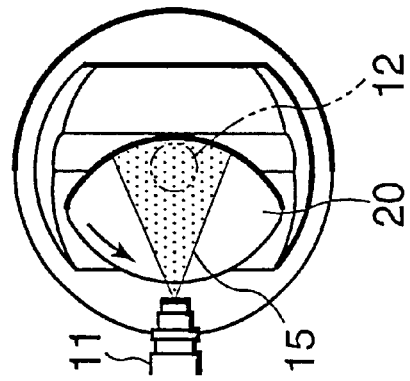

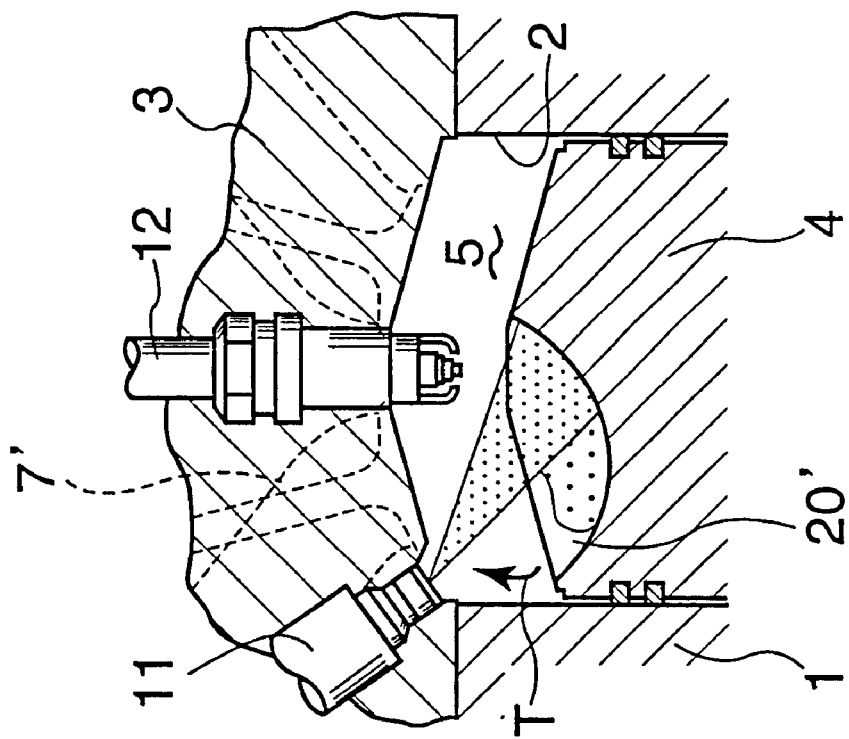
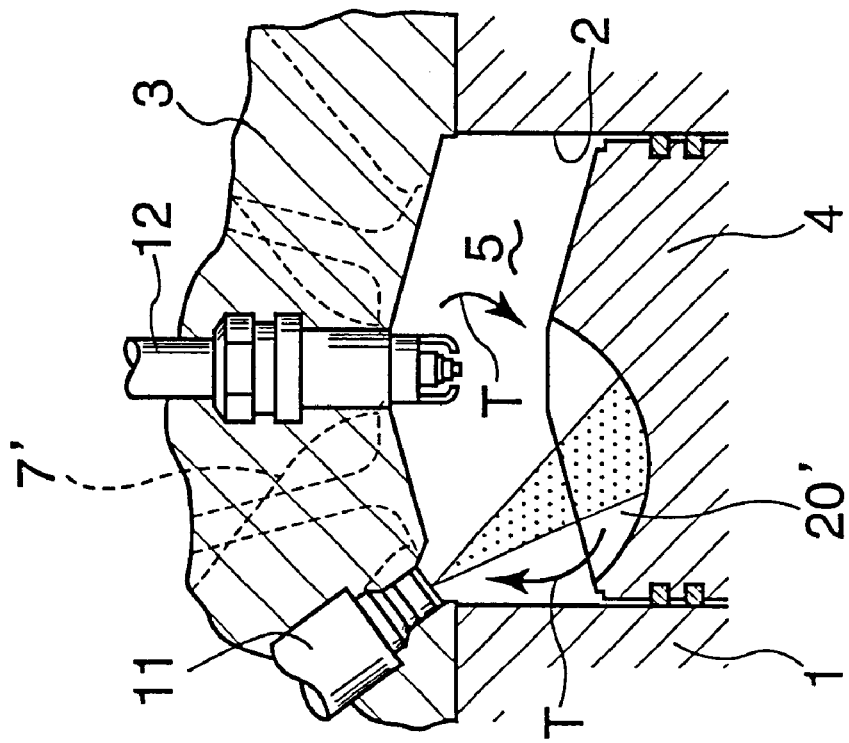

US 6,311,665 B1

DIRECT INJECTION ENGINE

This application is based on patent application No. 10-351875 filed in Japan, the contents of which are hereby incorporated by references.

BACKGROUND OF THE INVENTION

This invention relates to a direct injection engine which is provided with an injector for injecting fuel directly into a combustion chamber and produces stratified charge combustion by injecting the fuel during each compression stroke in a low-speed, low-load engine operating range, for instance.

Direct injection engines are commonly known in the prior art. In one example, a conventional direct injection engine comprises a piston having a cavity formed in its top surface, an injector for injecting fuel directly into a combustion chamber, and a spark plug located in the vicinity of the cavity, wherein the injector injects the fuel toward the cavity during a compression stroke in a low-speed, low-load operating range, for instance, so that a mixture is locally distributed around the spark plug, causing stratified charge combustion to occur. In this direct injection engine, it is possible to significantly increase the average air-fuel ratio (leaner mixture) due to the stratified charge combustion and thereby achieve improved fuel economy.

In the aforementioned conventional direct injection engine, it is desirable to expand the operating range in which the stratified charge combustion takes place as much as possible in order to increase fuel economy improvement effect. However, there arises a problem that the mixture becomes overrich around the spark plug if the amount of injected fuel increases in a relatively high-load region within the stratified charge combustion range.

More particularly, a condition in which a mixture having an appropriate air-fuel ratio is locally distributed around the spark plug is obtained when the amount of injected fuel is small because a fuel spray injected from the injector during the compression stroke is trapped by the cavity in the piston, concentrating the mixture around the spark plug. When the amount of injected fuel increases, however, the fuel is too concentrated around the spark plug and this produces an overrich mixture around the spark plug.

To avoid this problem, U.S. Pat. No. 5,553,588 proposes an engine comprising a piston having a cavity formed in its top surface, a spark plug an injector, and means for producing a swirl within the cavity, wherein the injector is installed with its nozzle opening oriented at an oblique angle to the direction of a central axis of the injector so that the fuel injecting direction points to the upstream side of the spark plug with respect to the rotating direction of the swirl.

According to this engine, a fuel spray injected from the injector is diverted from the direction of the spark plug and reaches an area of a cavity wall on the upstream side of the spark plug with respect to the rotating direction of the swirl, where the fuel spray is caused to spread to a certain extent by the swirl. The fuel spray flows downstream along the swirl while achieving a flammability limit air-fuel ratio, and passes close to the spark plug. Therefore, compared to other conventional engines in which the fuel is concentrated around the spark plug, the engine of U.S. Pat. No. 5,553,588 makes it possible to prevent excessive richness of the mixture to a certain degree and expand the operating range in which the stratified charge combustion can take place.

Even when the nozzle opening of the injector is always oriented to the upstream side of the spark plug to divert the fuel spray away from the direction of the spark plug, this arrangement alone is not sufficient, because spreading of the mixture would become insufficient and an overrich mixture mass could be formed locally when the amount of injected fuel is increased to a certain degree. Thus, there is left room for improvements in the above-described arrangement.

SUMMARY OF THE INVENTION

It is an object of the invention to provide a direct injection engine which has overcome the problems residing in the prior art.

According to an aspect of the invention, a direct injection engine comprises a piston having a cavity formed in its top surface, an injector for injecting fuel directly into a combustion chamber, and a spark plug located in the vicinity of the cavity. The injector injects the fuel toward the cavity in a compression stroke so that a mixture is locally distributed around the spark plug. The direction of a fuel spray formed by the fuel injected from the injector is varied during a fuel injection period.

Since the direction of the fuel spray is gradually varied with the lapse of time from the beginning of fuel injection in the compression stroke in this construction, the mixture produced as the fuel is mixed with air at a forward part of the fuel spray is caused to spread over a proper area including a region immediately around the spark plug. Therefore, it is possible to enhance the effect of preventing local overrichness of the mixture when the amount of injected fuel is large, compared to the aforementioned conventional engine.

BRIEF DESCRIPTION OF THE DRAWINGS

FIGS. 8A–8D are schematic plan views showing how conditions of a fuel spray and a resultant air-fuel mixture vary with the lapse of time from the beginning of fuel injection in the compression stroke;

FIGS. 13A–13B are schematic plan views showing how conditions of the fuel spray and the air-fuel mixture vary with the lapse of time from the beginning of fuel injection in the compression stroke in one varied form of the second embodiment.

DETAILED DESCRIPTION OF THE PREFERRED EMBODIMENTS OF THE INVENTION

Figure 1:
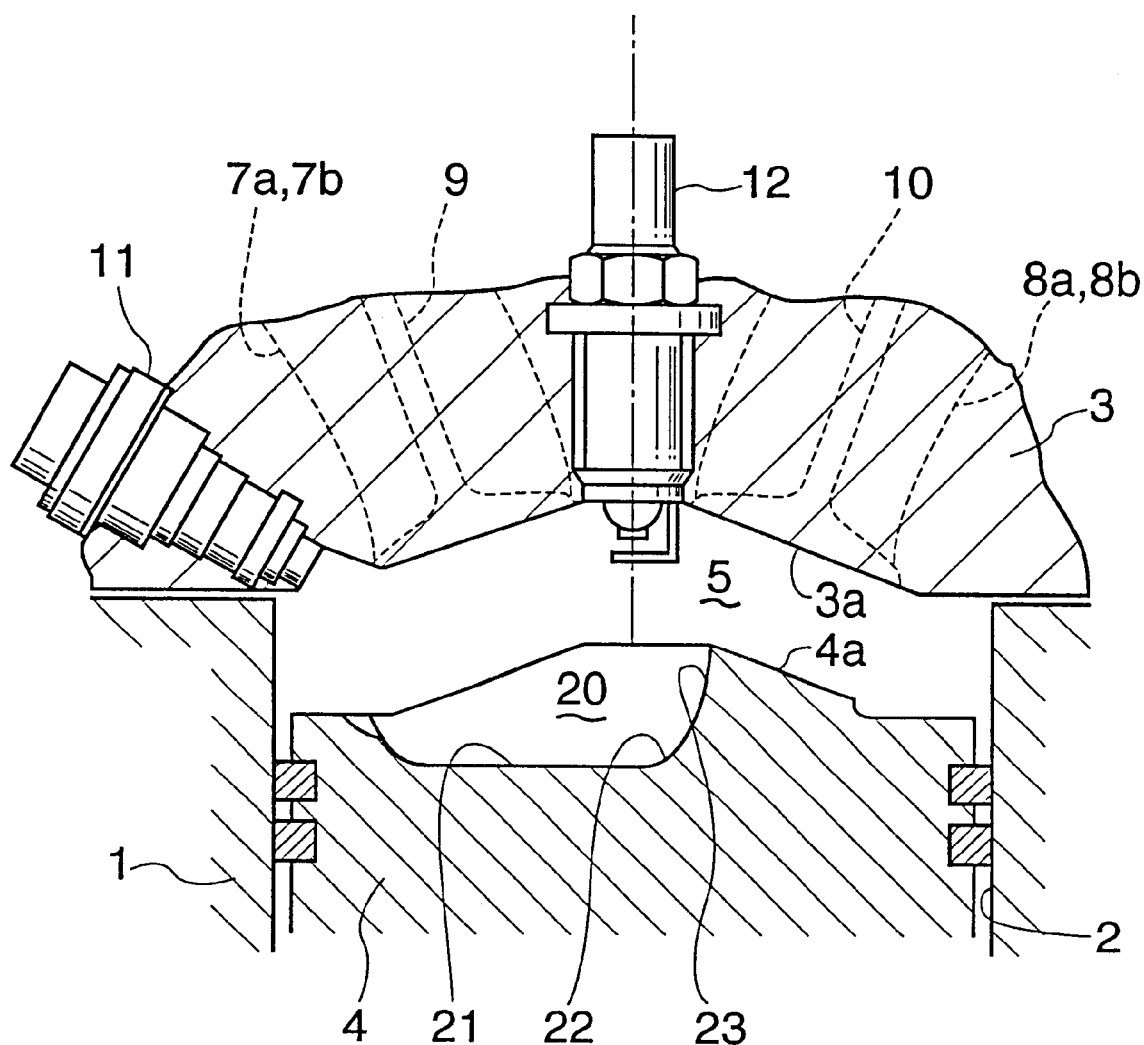
FIG. 1 is a vertical cross-sectional diagram showing a principal portion of an engine according to a first embodiment of the invention.

Referring to FIG. 1, a direct injection engine according to a first embodiment of the invention comprises a cylinder block 1 having a plurality of cylinders 2 and a cylinder head 3 mounted on top of the cylinder block 1. A piston 4 is fitted in each cylinder 2 in such a way that the former can move up and down along an axial direction of the latter, and a combustion chamber 5 is formed between a top surface 4a of the piston 4 and a bottom surface 3a of the cylinder head 3.

The bottom surface 3a of the cylinder head 3 constituting a ceiling of the combustion chamber 5 is formed into a concave pent-roof shape. The top surface 4a of the piston 4 is also formed into a convex pent-roof shape corresponding to the shape of the bottom surface 3a of the cylinder head 3, except that a generally U-shaped cavity 20 which will be described later in detail is formed in the top surface 4a of the piston 4.

Figure 3:
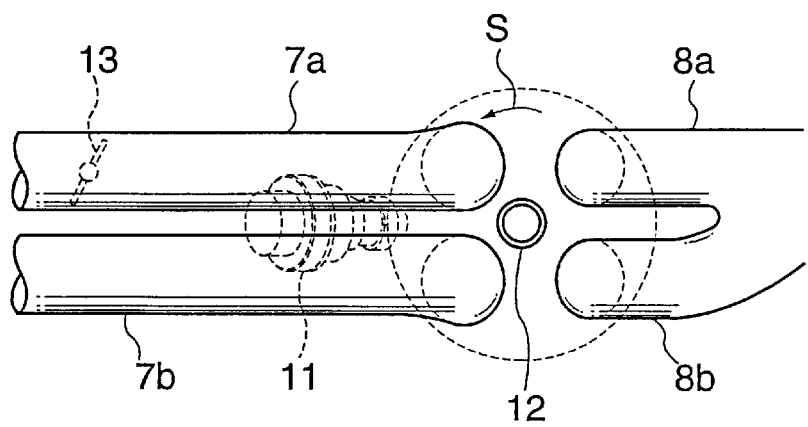
FIG. 3 is a schematic plan view showing intake ports and exhaust ports of the engine.

As shown also in FIG. 3, two each intake ports 7a, 7b and exhaust ports 8a, 8b opening into the combustion chamber 5 are formed in the cylinder head 3 and there are provided intake valves 9 and exhaust valves 10 for opening and closing the respective intake ports 7a, 7b and exhaust ports 8a, 8b. An injector 11 provided at a peripheral part of the combustion chamber 5 for directly injecting fuel into the combustion chamber 5 and a spark plug 12 provided at a central part of the combustion chamber 5 are fitted in the cylinder head 3 as illustrated.

Further, there is provided a swirl control valve 13 in one of the intake ports 7a, 7b (intake port 7a in this embodiment as depicted in FIG. 3). The intake ports 7a, 7b and the swirl control valve 13 together constitute swirl generating means for producing a swirl S within the combustion chamber 5. More particularly, when an intake air flow through the intake port 7a is shut off or restricted by the swirl control valve 13, an intake air flow entering the combustion chamber 5 through the intake port 7b produces the swirl S turning in one direction inside the combustion chamber 5. In the illustrated example, this swirl S rotates in the counterclockwise direction in plan view. The swirl S is most intensified when the swirl control valve 13 is fully closed, and "swirl ratio" in this condition is set to about 3 to 4.

Figure 4:
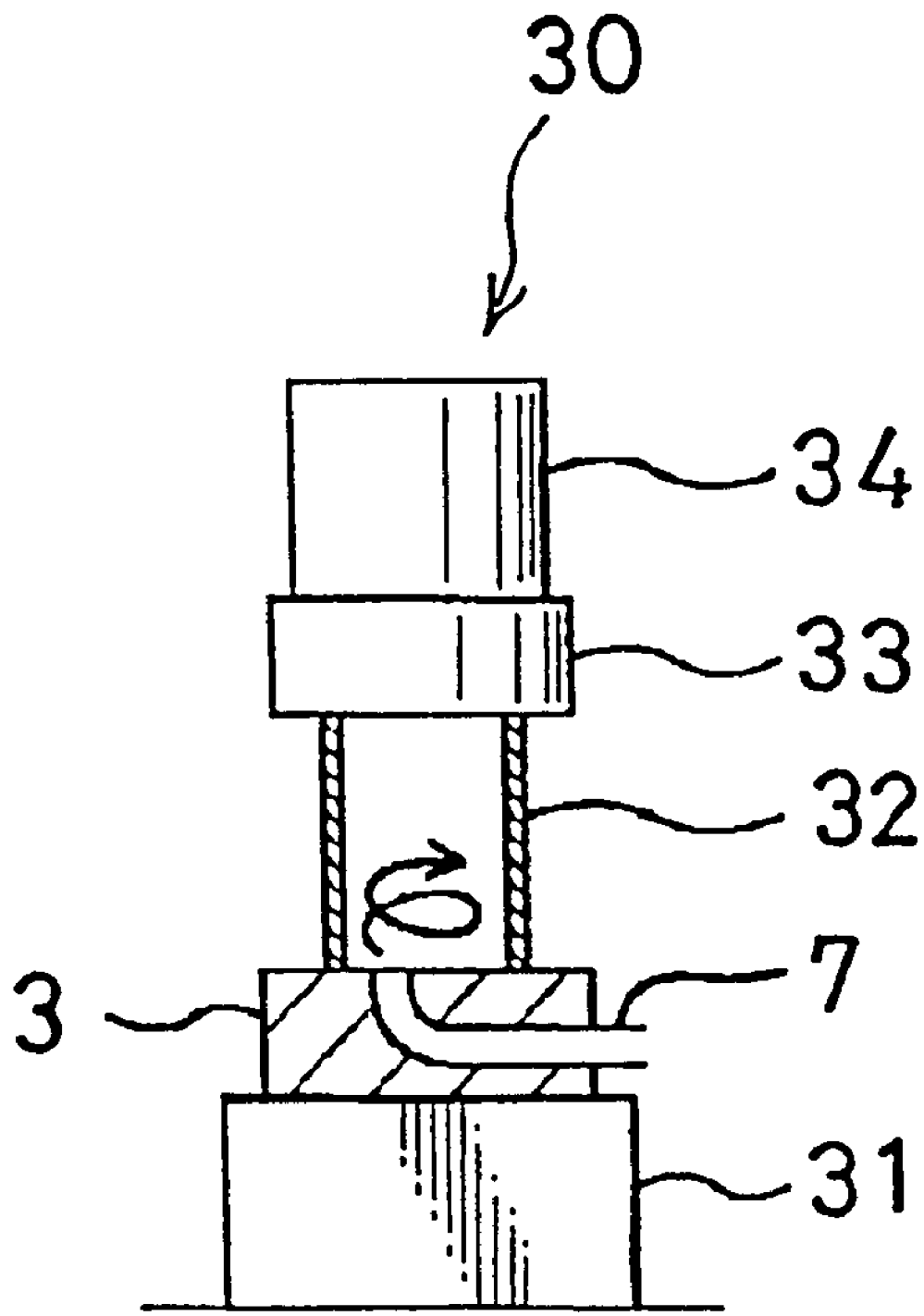
FIG. 4 is a schematic diagram showing a measuring apparatus for measuring swirl ratio.

Here, the swirl ratio mentioned above is a value obtained by dividing a value obtained by measuring the angular velocity of the swirl S in its rotating direction every valve lift and integrating successively measured angular velocities by the angular engine speed, wherein the angular velocity of the swirl S is determined by use of a measuring apparatus 30 shown in FIG. 4. Specifically, the measuring apparatus 30 is mounted on the cylinder head 3 which is placed upside down on a base 31 and the intake ports 7 are connected to an intake air supply unit which is not illustrated. Further, a cylinder 32 is placed on top of the cylinder head 3 and an impulse swirl meter 34 associated with a honeycomb rotor 33 on the bottom side is connected to the top of the cylinder 32. The distance between the top of the cylinder head 3 and the bottom of the impulse swirl meter 34 is made equal to 1.75 times the diameter of the cylinder 32. The impulse swirl meter 34 measures torque acting on the honeycomb rotor 33 that is caused by a swirl produced within the cylinder 32 by an inflow of air from the intake air supply unit. The angular velocity of the swirl in its rotating direction is obtained from measurement values given by the impulse swirl meter 34.

The injector 11 provided at the peripheral part of the combustion chamber 5 is located between the two intake ports 7a, 7b, and the fuel injecting direction of the injector 11 approximately matches the direction of a central axis of the injector 11. The injector 11 is disposed such that the fuel is injected obliquely downward from the injector 11, toward the central part of the combustion chamber 5 in plan view.

The cavity 20 is formed generally into a U shape in cross section from a central top part of the piston 4 close to the spark plug 12 to a side sloping part of the top surface 4a of the piston 4 near the injector 11. As shown in the cross-sectional diagram of FIG. 1, the cavity 20 includes a generally horizontal flat bottom surface 21, which is connected to a curved surface portion 22 and then to an upward-rising surrounding wall 23. The cavity 20 has an oval shape in plan view with its major axis oriented at right angles to a straight line connecting the injector 11 and the spark plug 12.

In a low-speed, low-load operating range of the engine, for instance, the injector 11 injects the fuel from its nozzle opening toward the cavity 20 in a compression stroke to produce a mixture locally distributed around the spark plug 12 and stratified charge combustion is caused to occur when the mixture is ignited by the spark plug 12.

Particularly characteristic of the engine of this invention is that it is constructed such that the direction of a fuel spray ejected from the injector 11 varies during each fuel injection period. In this embodiment, the direction of the fuel spray is varied by the swirl S as penetration of the fuel spray decreases with the progress of the compression stroke.

Specifically, the penetration of the fuel spray from the injector 11 is affected by the pressure in the cylinder 2, and when the spray penetration is relatively small and the swirl S is intensive, the direction of the fuel spray is bent by the influence of the swirl S. Thus, the fuel injecting direction of the injector 11, the spray penetration and the swirl ratio are determined such that the fuel spray is directed toward the spark plug 12 when the pressure in the cylinder 2 is low in the compression stroke, and the fuel spray is deflected away from the spark plug 12 by the swirl S as the pressure in the cylinder 2 increases.

Figure 2:
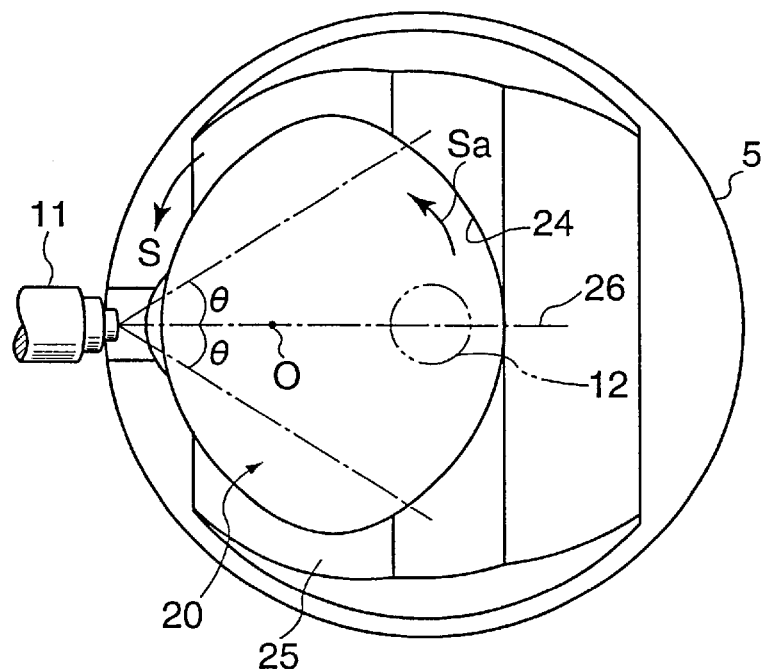
FIG. 2 is a plan view of a top surface portion of a piston.

More particularly, the swirl S occurs in an intake stroke due to the intake air flow entering the combustion chamber 5 through the intake port 7b and remains even in the compression stroke. This swirl S rotates in one direction within the combustion chamber 5 passing close to the nozzle opening of the injector 11 (counterclockwise in plan view as shown by an arrow in FIG. 3, for example). As the swirl S flows into the cavity 20, an air flow Sa passing close to an extreme end of the spark plug 12 along the surrounding wall 23 of the cavity 20 is produced at the central part of the combustion chamber 5 as depicted in FIG. 2.

On the other hand, the fuel is injected from the injector 11 toward the spark plug 12 (more exactly, in a direction toward a point below the spark plug 12 within the cavity 20). When the pressure within the cylinder 2 is low in the compression stroke, the spray penetration is deep and the fuel spray is scarcely bent and directed toward the spark plug 12. The spray penetration decreases as the pressure in the cylinder 2 increases with the progress of the compression stroke. As will be described later in detail, the fuel injecting direction of the injector 11, the spray penetration and the swirl ratio are determined such that the direction of the fuel spray is varied by that portion of the swirl S which passes close to the nozzle opening of the injector 11 when the spray penetration decreases, and as a consequence, the fuel spray is directed to the upstream side of the spark plug 12 with respect to the flow direction of the air flow Sa.

To enhance the swirl S in a latter part of the compression stroke, there is formed a squish area 25 on the top surface 4a of the piston 4 outside the periphery of the cavity 20. This squish area 25 comes close to the bottom surface 3a of the cylinder head 3 at every piston top dead center.

Of the entire surrounding wall 23 of the cavity 20 having the oval shape in plan view, a portion 24 near the central part of the piston 4 that is opposite to the injector 11 is formed to have an arc-shaped outer edge of a specific curvature in plan view. The extent of this portion 24 forming the arc-shaped outer edge of the specific curvature corresponds to an angular range in which the direction of the fuel spray varies according to variations in the pressure in the cylinder 2 during the compression stroke. As already mentioned, the direction of the fuel spray varies with the progress of the compression stroke. If the angle of maximum bending of the fuel spray with respect to a straight line 26 connecting the injector 11 and the spark plug 12 is θ in plan view, the portion 24 forming the arc-shaped outer edge of the specific curvature encompasses an angular extent defined by the angle of maximum bending θ taken on both sides of the straight line 26 (hereinafter referred to as the injecting direction reference line 26).

The spray penetration decreases as the pressure in the cylinder 2 increases as stated above. As a result, the angle of bending of the fuel spray increases and its penetrating distance, or the spray travel, decreases. For this reason, the aforementioned portion 24 of the surrounding wall 23 of the cavity 20 is formed such that the distance from the injector 11 to the arc-shaped portion 24 of the surrounding wall 23 gradually decreases with an increase in angular distance from the injecting direction reference line 26. This means that the outer edge of the portion 24 forms an arc of the specific curvature of which center of curvature O is located at a position offset from the nozzle opening of the injector 11 toward the center of the combustion chamber 5 by a specified distance.

Operation of the direct injection engine of this embodiment constructed as described above is discussed in the following.

Figure 5:
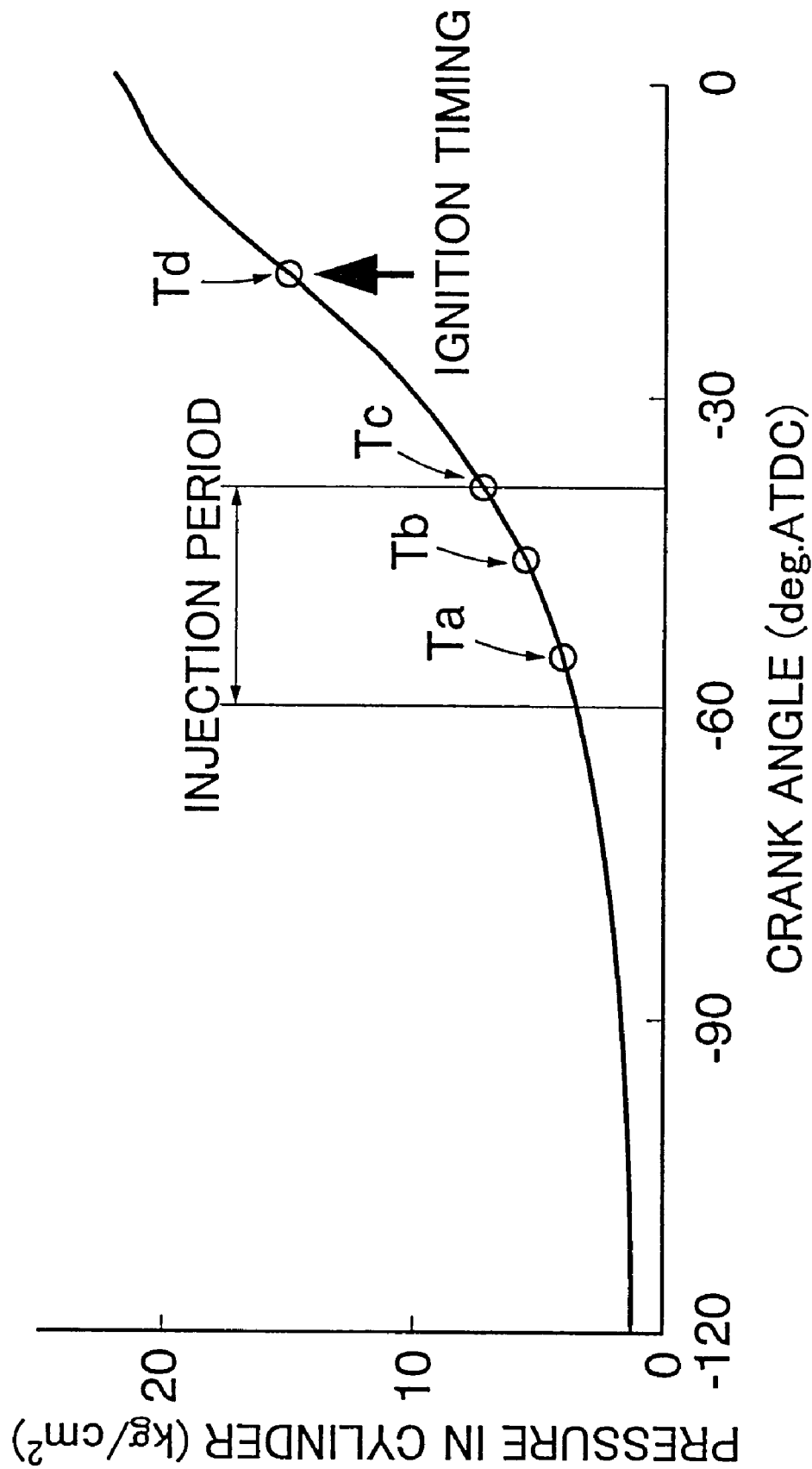
FIG. 5 is a graph showing pressure variations in a cylinder during a compression stroke.

In a graph of FIG. 5, the horizontal axis represents crank angle and the vertical axis represents the pressure in the cylinder 2. This graph shows pressure variations in the cylinder 2 during a period from 120° before the top dead center (BTDC), or −120° after the top dead center (ATDC), up to the top dead center (TDC), as well as fuel injection timing and injection period of the injector 11 and ignition timing used when the stratified charge combustion is performed by injecting the fuel during the compression stroke. As shown in FIG. 5, when the stratified charge combustion is performed in the low-speed, low-load range, for instance, fuel injection from the injector 11 is made in the latter part of the compression stroke and the injection period and injection timing are adjusted such that the necessary amount of fuel to be injected depending on engine operating conditions is obtained and the fuel injection is finished earlier than the injection timing by a specified crank angle.

Although the pressure in the cylinder 2 is relatively low in an initial part of the injection period, it gradually increases with the progress of the compression stroke and reaches a considerably high level in a final part of the injection period.

Figure 6:
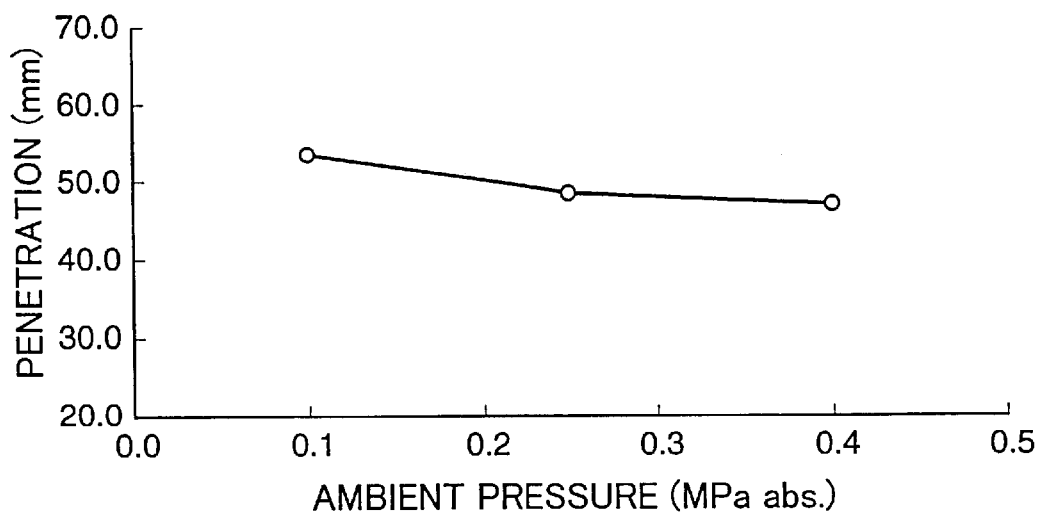
FIG. 6 is a graph showing the relationship between penetration of fuel injected from an injector and ambient pressure.
Figure 7:
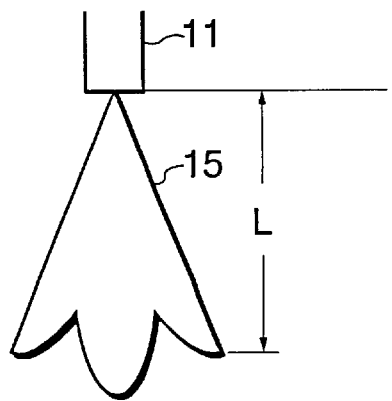
FIG. 7 is an explanatory diagram showing how the penetration is defined.

FIG. 6 shows experimental data on the relationship between ambient pressure corresponding to the pressure in the cylinder 2 during the compression stroke and penetration of the fuel injected from the injector 11, wherein the penetration of the fuel is expressed in terms of travel L of a fuel spray 15 reached when a specified time period has elapsed from injection as depicted in FIG. 7. It can be seen from FIG. 6 that the penetration of the fuel decreases as the pressure in the cylinder 2 increases due to an increase in air resistance.

FIGS. 8A–8D are diagrams showing how conditions of the fuel spray 15 and a resultant air-fuel mixture 16 vary with the lapse of time after fuel injection from the injector 11 during the compression stroke, in which FIG. 8A shows a state in the initial part of the injection period (point Ta in FIG. 5), FIG. 8B shows a state in a middle part of the injection period (point Tb in FIG. 5), FIG. 8C shows a state in the final part of the injection period (point Tc in FIG. 5), and FIG. 8D shows a state at the ignition timing (point Td in FIG. 5). In FIGS. 8A–8D, relatively densely dotted areas represent the fuel spray 15 from the injector 11 while coarsely dotted areas represent the mixture 16 produced as the fuel spray 15 mixes with air flowing within the cavity 20.

Figure 9:
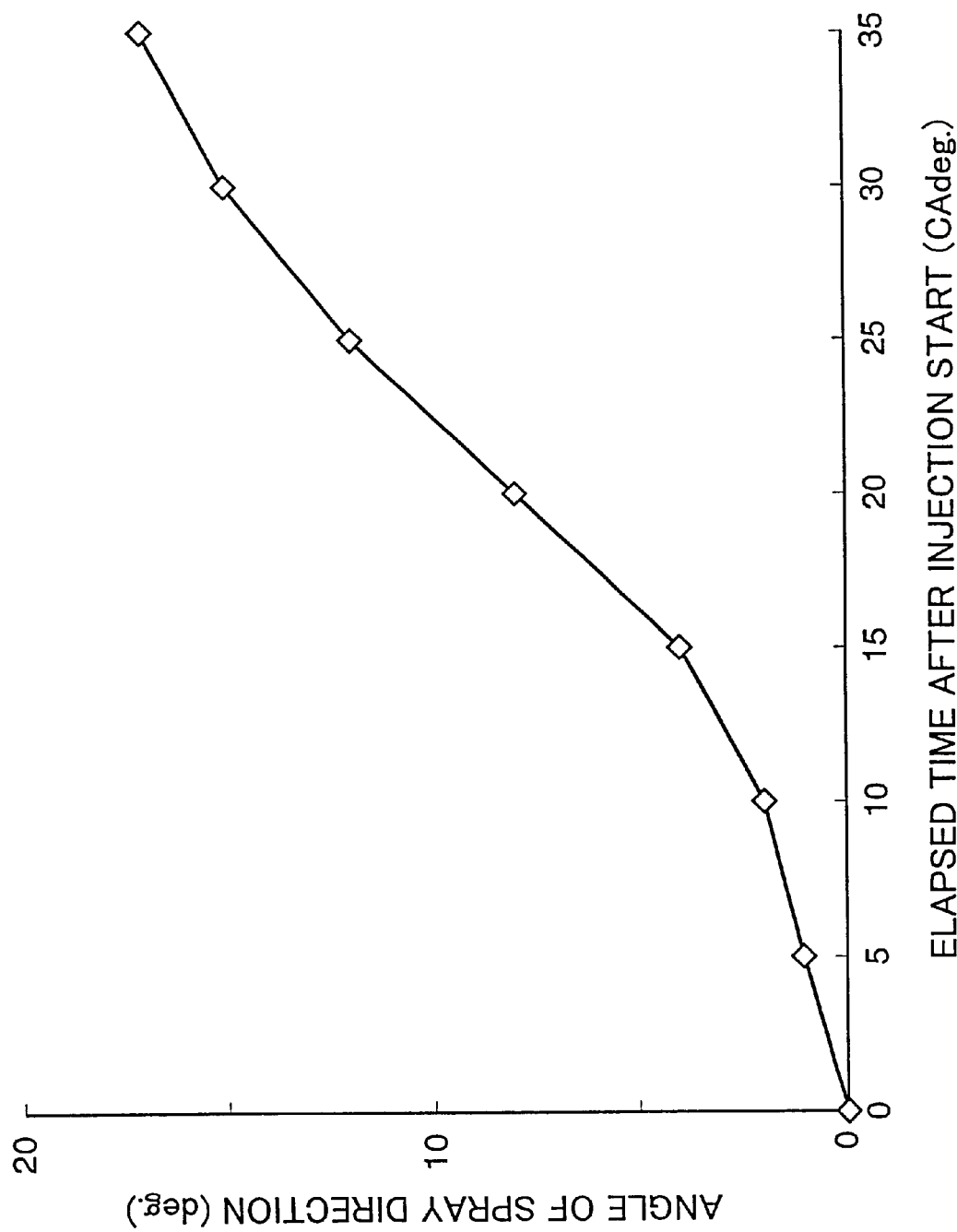
FIG. 9 is a graph showing variations in the angle of bending of the fuel spray with the lapse of time from the beginning of fuel injection in the compression stroke.

It can be seen from FIGS. 5–7 and 8A–8D that the pressure in the cylinder 2 is low and the penetration of the fuel injected from the injector 11 is large in the initial part of the injection period, so that the fuel spray 15 is scarcely bent and directed toward the spark plug 12. As the compression stroke proceeds from this point, the pressure in the cylinder 2 gradually rises and the penetration of the fuel decreases correspondingly, so that the fuel spray 15 becomes more likely to be affected by the swirl S. Consequently, the fuel spray 15 is bent by that portion of the swirl S which passes close to the nozzle opening of the injector 11. As shown in FIG. 9, the angle of spray direction relative to the injecting direction reference line 26 (i.e., the angle of bending of the fuel spray 15 by the swirl S) increases with the lapse of time from an injection starting point.

Since the squish area 25 is formed outside the outer periphery of the cavity 20, squish is created on the squish area 25 when the piston 4 approaches its top dead center. The squish serves to enhance spray bending effects of this embodiment by accelerating the swirl S or by preventing its attenuation.

The bending of the fuel spray 15 is explained more specifically referring to FIGS. 2, 8A–8D. In the example shown in these Figures, the fuel is injected to the right from the injector 11 which is located on the left side of the combustion chamber 5 and the swirl S rotates counterclockwise. The fuel spray 15 is bent downward as illustrated by that portion of the swirl S which passes close to the nozzle opening of the injector 11 and the air flow Sa produced by the swirl S which has flown into the cavity 20 flows upward as illustrated along the aforementioned portion 24 of the surrounding wall 23 that is opposite to the injector 11. The fuel spray 15 bent by the swirl S in this fashion is directed to the upstream side of the spark plug 12 with respect to the flow direction of the air flow Sa.

At a forward part of the fuel spray 15, the fuel is mixed with air due to the air flow Sa moving along the surrounding wall 23 of the cavity 20 and is evaporated or atomized in this air-fuel mixing process. The resultant mixture 16 is carried by the air flow Sa from the upstream side to the downstream side of the spark plug 12.

Thus, the fuel spray 15 is bent by a progressively larger angle with the lapse of time from the beginning of fuel injection in the injection period as shown in FIGS. 8B and 8C. The direction in which the fuel spray 15 points varies toward the upstream side of the spark plug 12 with respect to the flow direction of the air flow Sa, and the mixture 16 formed at the forward part of the fuel spray 15 gradually moves downstream along the air flow Sa. In this fuel injection process, a mixture mass formed by the fuel injected in the initial part of the injection period is carried to the downstream side of the spark plug 12 by the air flow Sa, whereas mixture masses formed by the fuel injected later in the injection period are left upstream in the air flow Sa. Consequently, a condition in which the mixture 16 of a proper air-fuel ratio is distributed in an area encompassing from the upstream side to the downstream side of the spark plug 12 at the ignition point is obtained as illustrated in FIG. 8D.

Since the mixture 16 is caused to properly spread and its local overrichness is avoided in the above-described manner, ignitability and combustibility of the mixture 16 are improved.

Particularly because the cavity 20 has the oval shape in plan view with its major axis oriented at right angles to the injecting direction reference line 26 and the portion 24 of the surrounding wall 23 of the cavity 20 opposite to the injector 11 is formed to make the arc-shaped outer edge of the specific curvature encompassing the angular range in which the direction of the fuel spray 15 varies according to variations in the pressure in the cylinder 2 during the compression stroke, the air flow Sa within the cavity 20 smoothly turns along the arc-shaped portion 24 of the surrounding wall 23 having the specific curvature throughout an angular range in which the direction of the fuel spray varies after the beginning of fuel injection.

Furthermore, because the cavity 20 is formed such that the center of curvature O of the arc-shaped portion 24 of the surrounding wall 23 located opposite to the injector 11 is offset from the nozzle opening of the injector 11 toward the center of the combustion chamber 5 by the specified distance, it is possible to obtain a proper state of fuel distribution. More particularly, although the fuel spray 15 is bent and the spray travel shortens as the penetration of the fuel decreases due to an increase in the pressure within the cylinder 2 with the lapse of time from the beginning of fuel injection, the distance from the nozzle opening of the injector 11 to the surrounding wall 23 of the cavity 20 decreases correspondingly, so that the fuel spray 15 reaches the air flow Sa moving along the surrounding wall 23 and is mixed with air and flown downstream along the air flow Sa. As a consequence, the condition in which the mixture 16 of a proper air-fuel ratio is distributed from the upstream side to the downstream side of the spark plug 12 along the air flow Sa is satisfactorily obtained.

While FIGS. 8A–8D depict a situation where the amount of injected fuel is relatively large, proper mixture distribution can be achieved by adjusting the fuel injection timing to obtain a generally constant injection ending point even when the amount of injected fuel is varied. When the amount of injected fuel is small, for example, the injection starting point is delayed compared to the case where the amount of injected fuel is large so that dispersion of the mixture 16 to the downstream side along the air flow Sa is reduced and a condition in which the mixture 16 of a proper air-fuel ratio is distributed is obtained without making the mixture 16 too lean. It is therefore possible to produce satisfactory stratified charge combustion even under low-load conditions requiring a small amount of injected fuel.

Figure 10:
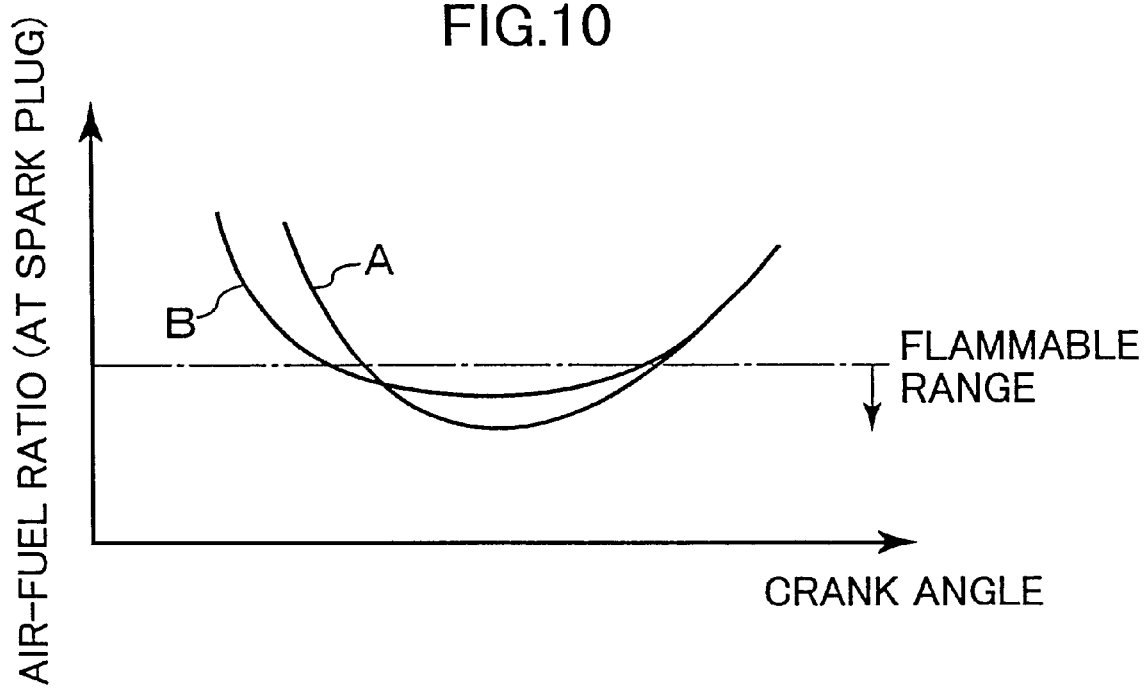
FIG. 10 is a graph showing changes in air-fuel ratio at the location of a spark plug during the compression stroke.

Referring to FIG. 10, differences in operational features between the aforementioned engine of this embodiment and the earlier-described conventional engine of U.S. Pat. No. 5,553,288 are described. FIG. 10 is a graph showing how the local air-fuel ratio immediately around the spark plug varies during the compression stroke, in which the horizontal axis represents the crank angle and the vertical axis represents the air-fuel ratio. In this graph, a curve A shows the air-fuel ratio in the conventional engine while a curve B shows the air-fuel ratio in the conventional engine of the embodiment.

It can be seen from FIG. 10 that, compared to the conventional engine in which the fuel is injected to the upstream side of the spark plug after the beginning of fuel injection, the fuel reaches the vicinity of the spark plug 12 and a flammability limit air-fuel ratio is attained earlier in the engine of the embodiment because the fuel is injected straight toward the spark plug 12 in the initial part of the injection period in this engine. In the engine of this embodiment, the direction of the fuel spray 15 is gradually varied toward the upstream side of the spark plug 12 with the lapse of time from the beginning of fuel injection. If the fuel spray 15 is deflected such that its direction becomes approximately same as that in the conventional engine in the final part of the injection period, the air-fuel ratio at the spark plug position exceeds the flammability limit air-fuel ratio almost at the same time after the end of fuel injection in both engines. Thus, it is understood from FIG. 10 that a time period during which the air-fuel ratio falls within a flammable range is longer in the engine of this embodiment than in the conventional engine.

When the time period in which the air-fuel ratio is within the flammable range is extended, an area in which mixture masses whose air-fuel ratio falls within the flammable range are distributed is increased and local overrichness of the mixture can be avoided correspondingly. This means that the invention serves to enhance the effect of preventing local overrichness of the mixture in a range where the amount of injected fuel is large and expand an engine operating range in which proper stratified charge combustion can be produced, compared to the earlier-mentioned conventional engine.

As described earlier, the injector of the conventional engine must be installed in such a way that its fuel injecting direction points to the upstream side of the spark plug. If the injector itself is installed with its central axis set at an oblique angle, however, the injected fuel could interfere with an intake port or other nearby parts. Thus, to overcome difficulties in component layout, it is necessary to form the nozzle opening of the injector at an oblique angle to the direction of the central axis of the injector. This arrangement of the conventional engine makes molding of the injector and its assembly into a cylinder head (in particular, adjustment of the direction of the nozzle opening) considerably complex. According to the foregoing embodiment, however, the direction of the fuel spray 15 is varied by the swirl S during the fuel injection period so that the nozzle opening may be oriented in the direction of the central axis of the injector 11. Therefore, molding operation of the injector 11 and its assembly are much simpler.

It is to be pointed out that the construction of the engine of this invention is not specifically limited to the foregoing embodiment but may be modified in various ways.

Figure 11A:
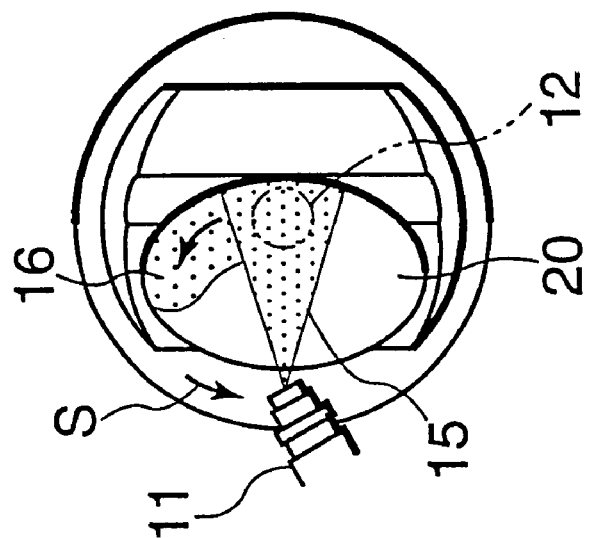
FIGS. 11A–11C are schematic plan views showing how conditions of the fuel spray and the air-fuel mixture vary with the lapse of time from the beginning of fuel injection in the compression stroke in one varied form of the first embodiment in which the direction of the fuel spray is varied by a swirl during a fuel injection period.
Figure 11B:
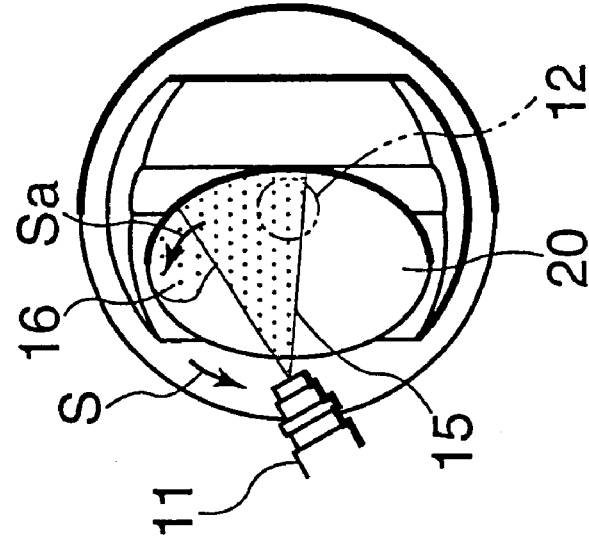
Figure 11C:
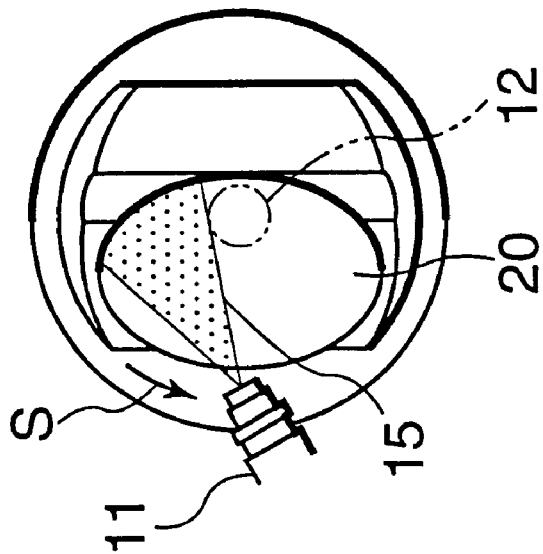

As described above, the direction of the fuel spray 15 from the injector 11 is gradually deflected with the aid of the swirl S during the compression stroke in such a way that the fuel spray 15 is directed toward the spark plug 12 when the pressure in the cylinder 2 is low in the compression stroke, and the fuel spray 15 is deflected away from the spark plug 12 as the pressure in the cylinder 2 increases in the aforementioned embodiment. FIGS. 11A–11C show a variation of the foregoing embodiment, in which the fuel spray 15 is oriented in a direction deflected from the spark plug 12 when the pressure in the cylinder 2 is low in the compression stroke, and the direction of the fuel spray 15 is gradually varied by the swirl S so that it is directed toward the spark plug 12 as the pressure in the cylinder 2 increases.

More particularly, the injector 11 is installed in such a way that its fuel injecting direction is deflected from the direction of the spark plug 12 and points to the downstream side of the spark plug 12 with respect to the flow direction of the air flow Sa in the variation of the first embodiment depicted in FIGS. 11A–11C. The fuel spray 15 is not bent by the swirl S but oriented in the predetermined fuel injecting direction of the injector 11 as shown in FIG. 11A in the initial part of the fuel injection period when the pressure within the cylinder 2 is low in the compression stroke, whereas the penetration of the fuel decreases and the fuel spray 15 is increasingly bent by the swirl S when the pressure within the cylinder 2 increases. Thus, parameters, such as the spray penetration and swirl ratio, are determined such that the direction of the fuel spray 15 is gradually varied toward the upstream side of the air flow Sa through the middle and final parts of the injection period as shown in FIG. 11B and 11C and the fuel spray 15 is directed almost straight toward the spark plug 12 at the end of the injection period.

The mixture 16 is caused to properly spread and its local overrichness can be avoided because the direction of the fuel spray 15 is varied by the swirl S during the fuel injection period in this varied form of the first embodiment as well. Furthermore, since the fuel spray 15 is directed almost toward the spark plug 12 in the final part of the injection period, a condition in which the mixture 16 of a proper air-fuel ratio is distributed is eventually obtained, whereby ignitability and combustibility of the mixture 16 are improved.

Figure 12A:
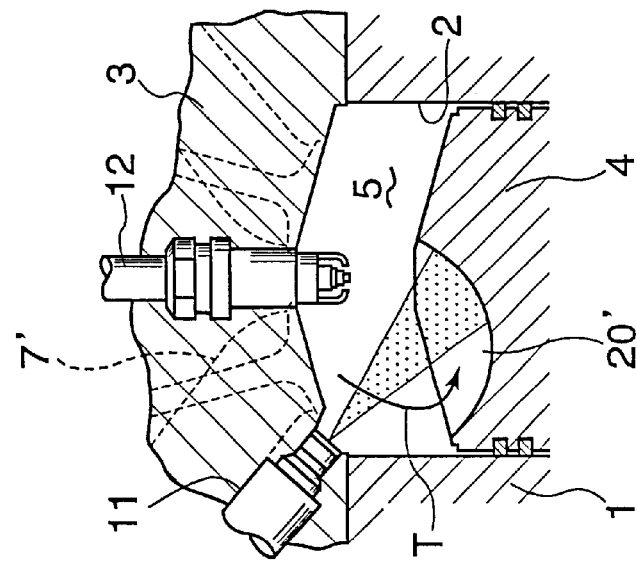
FIGS. 12A–12C are vertical cross-sectional diagrams showing how conditions of a fuel spray and a resultant air-fuel mixture vary with the lapse of time from the beginning of fuel injection during a compression stroke in an engine according to a second embodiment of the invention.
Figure 12B:
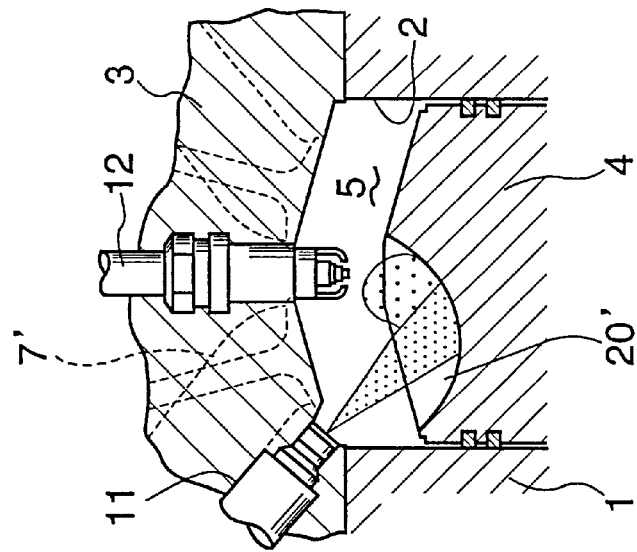
Figure 12C:
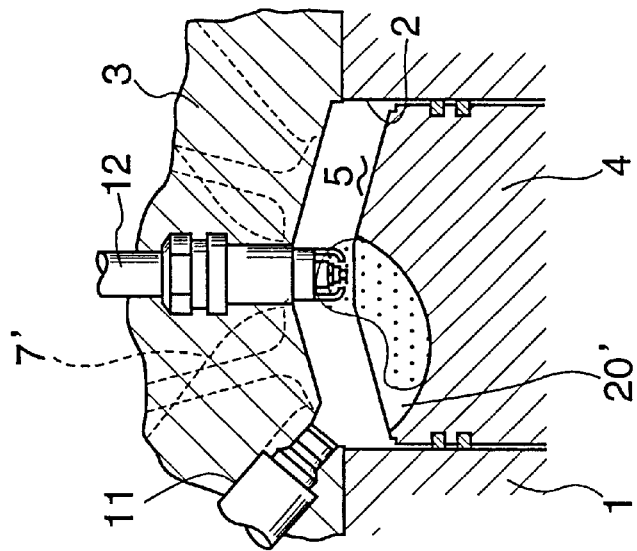

FIGS. 12A–12C show a direct injection engine according to a second embodiment of the invention, in which the engine comprises tumble generating means for generating a tumble within a combustion chamber 5, and the direction of a fuel spray can be varied by the tumble during a fuel injection period.

Specifically, while the construction of the engine of FIGS. 12A–12C is similar to that of the first embodiment in that a cavity 20' is formed in a top surface of a piston 4 fitted in a cylinder 2 and there are provided intake ports 7' and exhaust ports 8 opening into the combustion chamber 5, intake valves 9 and exhaust valves 10 for opening and closing the respective ports 7', 8, an injector 11 provided at a peripheral part of the combustion chamber 5 and a spark plug 12 provided at a central part of the combustion chamber 5, the intake ports 7' are shaped to produce a tumble T within the combustion chamber 5. In addition, the cavity 20' is generally arc-shaped in vertical cross section so that the tumble T can smoothly turn along the cavity 20'.

The engine is constructed such that the tumble T which has passed close to a nozzle opening of the injector 11 flows downward along a cylinder wall on the side of the intake ports 7', curves along the cavity 20' and then proceeds toward the spark plug 12.

The fuel injecting direction of the injector 11, spray penetration and tumble ratio are determined such that the fuel spray ejected from the injector 11 points to a position in the cavity 20' just below the spark plug 12 as shown in FIG. 12A when the pressure in the cylinder 2 is low in a compression stroke, and the fuel spray is bent downward by that portion of the tumble T which passes close to the nozzle opening of the injector 11 as shown in FIG. 12B as the pressure in the cylinder 2 increases, so that the fuel spray is oriented in a direction away from the spark plug 12 (to the upstream side of an air flow moving from the cavity 20' toward the spark plug 12).

Since the direction of the fuel spray is varied by the tumble T as the pressure in the cylinder 2 increases during the fuel injection period, and a mixture is caused to flow toward the spark plug 12 by the air flow moving from the cavity 20' toward the spark plug 12, the mixture is caused to properly spread as shown in FIG. 12C at the ignition point in this embodiment as well. Therefore, this embodiment provides the same advantageous effects as the first embodiment.

FIGS. 13A–13B show a variation of the second embodiment, in which the fuel spray is oriented in a direction deflected from the spark plug 12 when the pressure in the cylinder 2 is low in the compression stroke, and the fuel spray is gradually deflected by the tumble T so that it points to a position in the cavity 20' just below the spark plug 12 as the pressure in the cylinder 2 increases.

More particularly, the injector 11 is installed in such a way that its fuel injecting direction points to a position offset from the position in the cavity 20' just below the spark plug 12 in the variation of the second embodiment depicted in FIGS. 13A–13B. In this variation, the tumble T rotates in a direction opposite to the flow direction of the tumble T shown in FIGS. 12A–12C. Physical shapes of the intake ports 7' and the combustion chamber 5, for instance, are determined such that air introduced from the intake ports 7' flows rightward and then downward through a space on the exhaust port side, curves along the top surface of the piston 4 and climbs along the cylinder wall on the intake port side, thereby creating the tumble T as illustrated, and the tumble T thus produced passes close to the nozzle opening of the injector 11.

The fuel spray is not bent by the tumble T but oriented in the predetermined fuel injecting direction of the injector 11 as shown in FIG. 13A in the initial part of the fuel injection period when the pressure within the cylinder 2 is low in the compression stroke, whereas the penetration of the fuel decreases and the fuel spray is increasingly bent by the tumble T when the pressure within the cylinder 2 increases. Thus, parameters, such as the spray penetration and tumble ratio, are determined such that the fuel spray is directed to a point closer to the spark plug 12 in the final part of the injection period as shown in FIG. 13B.

The mixture is caused to properly spread and its local overrichness can be avoided because the direction of the fuel spray is varied by the tumble T during the fuel injection period in this varied form of the second embodiment as well. Furthermore, a condition in which the mixture of a proper air-fuel ratio is distributed around the spark plug 12 is obtained, so that ignitability and combustibility of the mixture are improved.

Main features and advantages of the aforementioned direct injection engines of the invention are as follows.

An direct injection engine of the invention comprises a piston having a cavity formed in its top surface, an injector for injecting fuel directly into a combustion chamber, and a spark plug located in the vicinity of the cavity, wherein the injector injects the fuel toward the cavity in a compression stroke so that a mixture is locally distributed around the spark plug, and wherein the direction of a fuel spray formed by the fuel injected from the injector is varied during a fuel injection period.

Preferably, the direct injection engine further comprises a swirl generator for producing a swirl within the combustion chamber and the spark plug is located at a position in front of the injector in plan view, wherein the fuel injecting direction of the injector, spray penetration and swirl ratio are determined such that the fuel spray ejected from the injector is directed toward the spark plug when the pressure in a cylinder is low in the compression stroke, and the fuel spray is deflected away from the direction of the spark plug by the swirl as the pressure in the cylinder increases.

According to this construction, the spray penetration is deep so that the fuel spray from the injector proceeds almost straight toward the spark plug when the pressure in the cylinder is relatively low in the compression stroke. When the pressure in the cylinder increases after the beginning of fuel injection with the progress of the compression stroke, however, the spray penetration decreases and the direction of the fuel spray is correspondingly varied by the swirl. As a result, the mixture is caused to spread over a proper area and the effect of preventing local overrichness of the mixture is successfully achieved.

In the direct injection engine of the invention, it is also preferable that the combustion chamber be constructed such that the swirl passes close to a nozzle opening of the injector in the compression stroke, flows into the cavity and rotates therein, producing an air flow passing close to the spark plug, and the fuel injecting direction, spray penetration and swirl ratio be determined such that the direction of the fuel spray from the injector is varied by that portion of the swirl which passes close to the nozzle opening of the injector when the pressure in the cylinder is high in the compression stroke, so that the fuel spray is directed to the upstream side of the spark plug with respect to the flow direction of the air flow passing close to the spark plug. In this construction, the mixture is caused to spread over an area encompassing from the upstream side to the downstream side of the spark plug with respect to the flow direction of the air flow passing close to the spark plug so that an appropriate distribution of the mixture is obtained.

Furthermore, if a squish area which comes close to a bottom surface of a cylinder head at piston top dead center is formed on the top surface of the piston outside the cavity, it becomes possible to accelerate the swirl or prevent its attenuation with the aid of squish in a latter part of the compression stroke when the fuel is injected from the injector.

Preferably, the cavity is formed into an oval shape in plan view with its major axis oriented at right angles to a straight line connecting the injector and the spark plug. It is particularly preferable that a portion of a wall surface of the cavity opposite to the injector be formed into the shape of an arc of a specified curvature in plan view, encompassing an angular range in which the direction of the fuel spray varies according to variations in the pressure in the cylinder during the compression stroke. In this construction, the air flow within the cavity smoothly flows along the arc-shaped portion of the wall surface of the cavity throughout the angular range in which the direction of the fuel spray varies so that the mixture can be effectively spread by the air flow within the cavity.

Furthermore, it is preferable that the wall surface of the cavity be formed such that the center of curvature of the arc-shaped portion of the wall surface is offset from the nozzle opening of the injector toward the center of the combustion chamber by a specified distance. While the fuel spray is bent and its penetrating distance shortens as the spray penetration decreases due to an increase in the pressure within the cylinder with the lapse of time from the beginning of fuel injection, the distance from the nozzle opening of the injector to the wall surface of the cavity correspondingly varies according to changes in the penetrating distance of the fuel spray in this construction. Therefore, the effect of spreading the mixture along the wall surface of the cavity is successfully achieved.

In another preferred form of the invention, the direct injection engine further comprises a swirl generator for producing a swirl within the combustion chamber and the spark plug is located at a position in front of the injector in plan view, wherein the fuel injecting direction of the injector, spray penetration and swirl ratio are determined such that the fuel spray from the injector is oriented in a direction deflected from the spark plug when the pressure in a cylinder is low in the compression stroke, and the direction of the spark plug is varied by the swirl so that it is directed toward the spark plug as the pressure in the cylinder increases.

According to this construction, the fuel spray from the injector proceeds in a direction deflected from the spark plug immediately after the beginning of fuel injection in the compression stroke when the pressure in the cylinder is relatively low and the spray penetration is deep. When the pressure in the cylinder increases after the beginning of fuel injection with the progress of the compression stroke, however, the spray penetration decreases and the direction of the fuel spray is correspondingly varied by the swirl toward the spark plug. Thus, the mixture is caused to spread over a proper area including a region immediately around the spark plug and the effect of preventing local overrichness of the mixture is successfully achieved in this construction as well.

In still another preferred form of the invention, the direct injection engine further comprises a tumble generator for producing a tumble within the combustion chamber and the spark plug is located at a position in front of the injector in plan view, wherein the fuel injecting direction of the injector, spray penetration and tumble ratio are determined such that the fuel spray from the injector is directed toward a point in the cavity corresponding to the spark plug when the pressure in a cylinder is low in the compression stroke, and the fuel spray is deflected away from the direction of the spark plug by the tumble as the pressure in the cylinder increases.

According to this construction, the spray penetration is deep so that the fuel spray from the injector proceeds almost straight toward the spark plug when the pressure in the cylinder is relatively low in the compression stroke. When the pressure in the cylinder increases after the beginning of fuel injection with the progress of the compression stroke, however, the spray penetration decreases and the direction of the fuel spray is correspondingly varied by the tumble. As a result, the mixture is caused to spread over a proper area and the effect of preventing local overrichness of the mixture is successfully achieved.

In yet another preferred form of the invention, the direct injection engine further comprises a tumble generator for producing a tumble within the combustion chamber and the spark plug is located at a position in front of the injector in plan view, wherein the fuel injecting direction of the injector, spray penetration and tumble ratio are determined such that the fuel spray from the injector is oriented in a direction deflected from the spark plug when the pressure in a cylinder is low in the compression stroke, and the direction of the spark plug is varied by the tumble so that it is directed toward a point in the cavity corresponding to the spark plug as the pressure in the cylinder increases.

According to this construction, the fuel spray from the injector proceeds in a direction deflected from the spark plug immediately after the beginning of fuel injection in the compression stroke when the pressure in the cylinder is relatively low and the spray penetration is deep. When the pressure in the cylinder increases after the beginning of fuel injection with the progress of the compression stroke, however, the spray penetration decreases and the direction of the fuel spray is correspondingly varied by the tumble toward the spark plug. Thus, the mixture is caused to spread over a proper area including a region immediately around the spark plug and the effect of preventing local overrichness of the mixture is successfully achieved in this construction as well.

It should be understood from the foregoing discussion that the mixture is properly distributed when the amount of injected fuel is large and the effect of preventing local overrichness of the mixture is enhanced by the present invention. Therefore, it is possible to expand the engine operating range in which stratified charge combustion can take place toward a high-load operating range of the engine while preventing overrichness of the mixture around the spark plug and thereby increase the fuel economy improvement effect.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A direct injection engine comprising:
   a piston having a cavity formed in its top surface;
   a spark plug located in the vicinity of the cavity; and
   an injector for injecting fuel toward the cavity in a compression stroke so that a mixture is locally distributed around the spark plug; and
   a swirl generator for producing a swirl within the combustion chamber;
   wherein the spark plug is located at a position in front of the injector in plan view; and the fuel injecting direction of the injector, spray penetration and swirl ratio are determined such that a direction of a fuel spray from the injector is varied during a fuel injection period and directed toward the spark plug when the pressure in a cylinder is low in the compression stroke, and the fuel spray is deflected away from the direction of the spark plug by the swirl as the pressure in the cylinder increases.

2. The direct injection engine according to claim 1, wherein the combustion chamber is constructed such that the swirl passes close to a nozzle opening of the injector in the compression stroke, flows into the cavity and rotates therein, producing an air flow passing close to the spark plug, and wherein the fuel injecting direction, spray penetration and swirl ratio are determined such that the direction of the fuel spray from the injector is varied by that portion of the swirl which passes close to the nozzle opening of the injector when the pressure in the cylinder is high in the compression stroke, so that the fuel spray is directed to the upstream side of the spark plug with respect to the flow direction of the air flow passing close to the spark plug.

3. The direct injection engine according to claim 2, wherein a squish area which comes close to a bottom surface of a cylinder head at piston top dead center is formed on the top surface of the piston outside the cavity.

4. The direct injection engine according to claim 2, wherein the cavity is formed into an oval shape in plan view with its major axis oriented at right angles to a straight line connecting the injector and the spark plug.

5. The direct injection engine according to claim 4, wherein a portion of a wall surface of the cavity opposite to the injector is formed into the shape of an arc of a specified curvature in plan view, the portion of the wall surface encompassing an angular range in which the direction of the fuel spray varies according to variations in the pressure in the cylinder during the compression stroke.

6. The direct injection engine according to claim 5, wherein the wall surface of the cavity is formed such that the center of curvature of the arc-shaped portion of the wall surface is offset from the nozzle opening of the injector toward the center of the combustion chamber by a specified distance.

7. The direct injection engine according to claim 1, wherein a squish area which comes close to a bottom surface of a cylinder head at piston top dead center is formed on the top surface of the piston outside the cavity.

8. The direct injection engine according to claim 1, wherein the cavity is formed into an oval shape in plan view with its major axis oriented at right angles to a straight line connecting the injector and the spark plug.

9. The direct injection engine according to claim 8, wherein a portion of a wall surface of the cavity opposite to the injector is formed into the shape of an arc of a specified curvature in plan view, the portion of the wall surface encompassing an angular range in which the direction of the fuel spray varies according to variations in the pressure in the cylinder during the compression stroke.

10. The direct injection engine according to claim 9, wherein the wall surface of the cavity is formed such that the center of curvature of the arc-shaped portion of the wall surface is offset from the nozzle opening of the injector toward the center of the combustion chamber by a specified distance.

11. A direct injection engine comprising:
    a piston having a cavity formed in its top surface;
    a spark plug located in the vicinity of the cavity; and an injector for injecting fuel toward the cavity in a compression stroke so that a mixture is locally distributed around the spark plug; and
    a swirl generator for producing a swirl within the combustion chamber;
    wherein the spark plug is located at a position in front of the injector in plan view, and the fuel injecting direction of the injector, spray penetration and swirl ratio are determined such that a direction of a fuel spray from the injector is varied during a fuel injection period and oriented in a direction deflected from the spark plug when the pressure in a cylinder is low in the compression stroke, and the direction of the fuel spray is varied by the swirl so that it is directed toward the spark plug as the pressure in the cylinder increases.

12. A direct injection engine comprising:

a piston having a cavity formed in its top surface;

a spark plug located in the vicinity of the cavity; and an injector for injecting fuel toward the cavity in a compression stroke so that a mixture is locally distributed around the spark plug; and a tumble generator for producing a tumble within the combustion chamber;

wherein the spark plug is located at a position in front of the injector in plan view, and the fuel injecting direction of the injector, spray penetration and tumble ratio are determined such that a direction of a fuel spray from the injector is varied during a fuel injection period and directed toward a point in the cavity corresponding to the spark plug when the pressure in a cylinder is low in the compression stroke, and the fuel spray is deflected away from the direction of the spark plug by the tumble as the pressure in the cylinder increases.

13. A direct injection engine comprising:

a piston having a cavity formed in its top surface;

a spark plug located in the vicinity of the cavity; and an injector for injecting fuel toward the cavity in a compression stroke so that a mixture is locally distributed around the spark plug; and a tumble generator for producing a tumble within the combustion chamber;

wherein the spark plug is located at a position in front of the injector in plan view, and the fuel injecting direction of the injector, spray penetration and tumble ratio are determined such that a direction of a fuel spray from the injector is varied during a fuel injection period and oriented in a direction deflected from the spark plug when the pressure in a cylinder is low in the compression stroke, and the direction of the spark plug is varied by the tumble so that it is directed toward a point in the cavity corresponding to the spark plug as the pressure in the cylinder increases.

* * * * *